United States Patent
Cai et al.

(10) Patent No.: US 12,512,212 B2
(45) Date of Patent: Dec. 30, 2025

(54) METHODS AND SYSTEMS TO IDENTIFY COLLABORATIVE COMMUNITIES FROM MULTIPLEX HEALTHCARE PROVIDERS

(71) Applicant: IQVIA Inc., Durham, NC (US)

(72) Inventors: Yong Cai, Marina, CA (US); Yanping Liu, Harleysville, PA (US); Ruoxin Li, Chapel Hill, NC (US); Emily Zhao, Wayne, PA (US); Yilian Yuan, North Wales, PA (US); William McClellan, Havertown, PA (US)

(73) Assignee: IQVIA Inc., Parsippany, NJ (US)

( * ) Notice: Subject to any disclaimer, the term of this patent is extended or adjusted under 35 U.S.C. 154(b) by 1044 days.

(21) Appl. No.: 17/557,282

(22) Filed: Dec. 21, 2021

(65) Prior Publication Data
US 2023/0197255 A1    Jun. 22, 2023

(51) Int. Cl.
*G16H 40/20* (2018.01)
*G06N 20/00* (2019.01)
*G06Q 50/00* (2012.01)

(52) U.S. Cl.
CPC .............. *G16H 40/20* (2018.01); *G06N 20/00* (2019.01); *G06Q 50/01* (2013.01)

(58) Field of Classification Search
None
See application file for complete search history.

(56) References Cited

U.S. PATENT DOCUMENTS

2020/0279151 A1* 9/2020 Li .................. G06F 16/9024

OTHER PUBLICATIONS

Chen et al., MSGCN: Multi-Subgraph Based Heterogeneous Graph Convolution Network Embedding, Appl. Sci. 2021, 11, 9832. https://doi.org/10.3390/app11219832; Oct. 19, 2021; Total pp. 17 (Year: 2021).*
Ostovari et al., Impact of care provider network characteristics on patient outcomes: Usage of social network analysis and a multi-scale community detection, PLOS ONE | https://doi.org/10.1371/journal.pone.0222016; Sep. 9, 2019 (Year: 2019).*

(Continued)

*Primary Examiner* — Alan Chen
(74) *Attorney, Agent, or Firm* — ALG Intellectual Property, LLC

(57) ABSTRACT

Methods and systems to identify collaborative communities of individuals from graphs of multiple types of relationships amongst the individuals, including to mine data related to multiple types of relationships amongst individuals, construct graphs to represent the respective types of relationships amongst individuals, and perform a multiplex graph convolutional network (MGCN) artificial intelligence machine learning (AIML) analysis across the multiple graphs to identify the collaborative communities. A mathematical representation of the graphs may be learned/tuned to optimize clustering of the individuals. Multiple parameters (inter-graph weights, consensus regularization function) may be jointly tuned based on a joint optimization function. The collaborative communities may be displayed such that relative positions of the individuals represent measures of influence exerted by the respective individuals within the respective collaborative communities.

20 Claims, 11 Drawing Sheets

(56) References Cited

OTHER PUBLICATIONS

Kim et al., Community Detection in Multi-Layer Graphs: A Survey; SIGMOD Record, Sep. 2015 (vol. 44, No. 3); pp. 37-48 (Year: 2015).*

Xiang et al., Network context matters: graph convolutional network model over social networks improves the detection of unknown HIV infections among young men who have sex with men; Journal of the American Medical Informatics Association, 26(11); Jun. 14, 2019; pp. 1263-1271 (Year: 2019).*

Yao et al., Graph Convolutional Networks for Text Classification, the Thirty-Third AAAI Conference on Artificial Intelligence (AAAI-19); 2019; pp. 7370-7375 (Year: 2019).*

Zhou et al., Graph neural networks: A review of methods and applications; AI Open 1 (2020); Apr. 8, 2021; pp. 57-81 (Year: 2021).*

CNN: Introduction to Pooling Layer, GeeksforGeeks, Jul. 29, 2021, Retrieved from: https://www.geeksforgeeks.org/cnn-introduction-to-pooling-layer/ Retrieved on: Nov. 1, 2021 (9 pages total).

Godec, Primoz, "Graph Embeddings: The Summary", Towards Data Science, Dec. 31, 2018, Retrieved from: https://towardsdatascience.com/graph-embeddings-the-summary-cc6075aba007 Retrieved on: Nov. 1, 2021 (11 pages total).

Teja, Rohith, "A Quick Note on Graphs and the Formulation of Their Downstream Tasks", Towards Data Science, Oct. 31, 2021, Retrieved from: https://towardsdatascience.com/a-quick-note-on-graphs-and-the-formulation-of-their-downstream-tasks-d8a8c808c93f Retrieved on: Nov. 1, 2021 (9 pages total).

* cited by examiner

METHODS AND SYSTEMS TO IDENTIFY COLLABORATIVE COMMUNITIES FROM MULTIPLEX HEALTHCARE PROVIDERS

BACKGROUND

Healthcare providers (HCP) naturally form collaborative communities to coordinate patient care and share medical knowledge and treatment information. Such HCP collaborative communities play an important role in integrating care, diffusing technology, reducing cost, and driving better health outcomes. However, collaborative communities are not formal groups or organizations, and there is no registry or database that directly captures them.

Challenges in detecting collaborative communities include disjunctive and disparate network information (i.e., no central data storage for data concerning multiple types of relationships), complexities of relationships amongst individuals (e.g., high dimensionality-many individuals and many types of relationships), especially amongst HCPs, astronomical numbers of community formations, and corresponding high computational demand.

Conventional approaches to analyzing relationships amongst HCPs only consider a single relationship at a time. Conventional approaches do not provide a comprehensive method of identifying collaborative communities of HCPs.

BRIEF DESCRIPTION OF THE DRAWINGS/FIGURES

Figure 1:
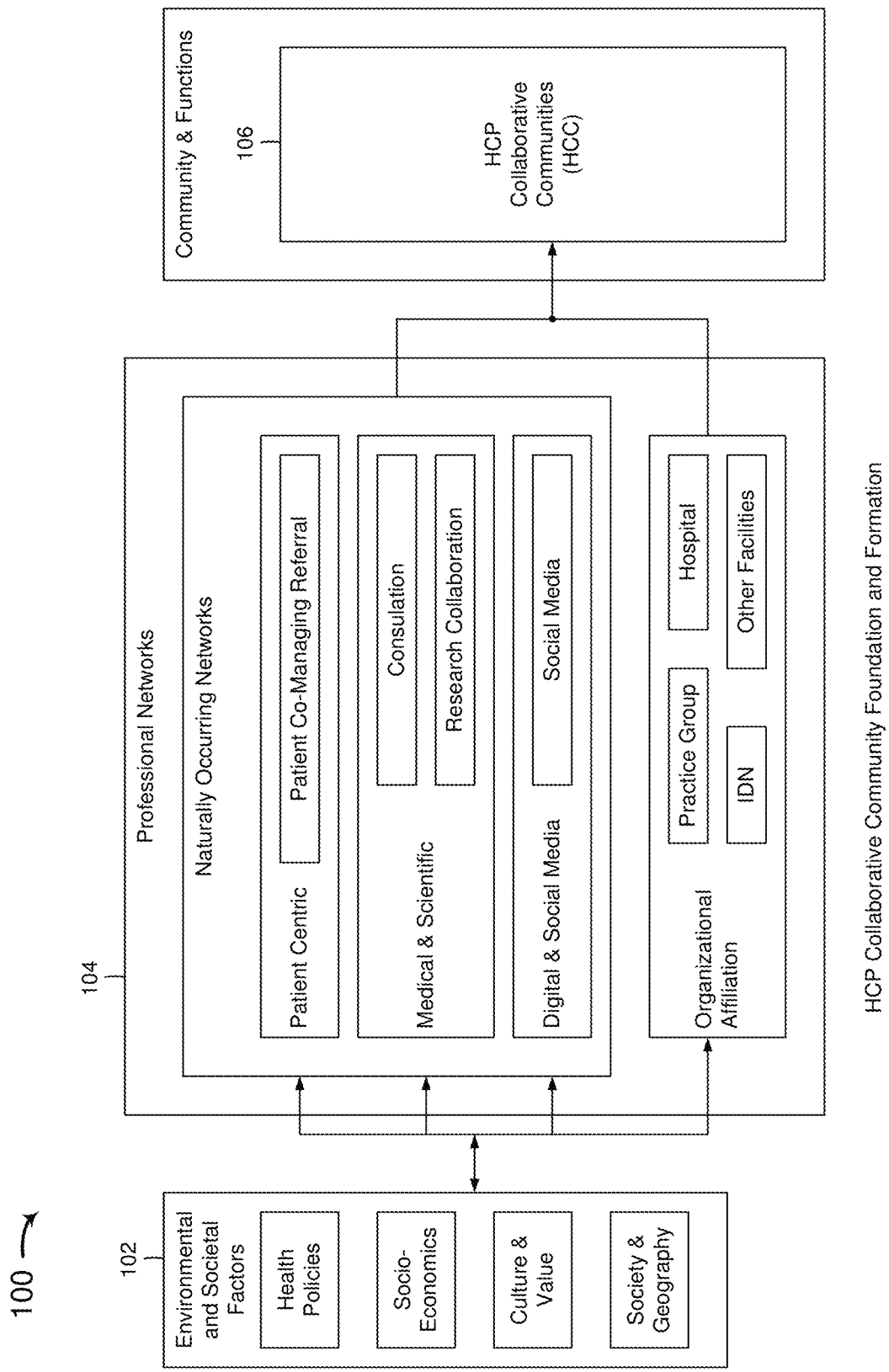
FIG. 1 illustrates an example health care provider (HCP) collaborative community environment.

In the drawings, the leftmost digit(s) of a reference number identifies the drawing in which the reference number first appears.

DETAILED DESCRIPTION

A conventional graph convolutional network (GCN) is a relatively powerful neural network architecture for machine learning on graphs. A conventional GCN is not, however, able to operate across multiple disparate types of graphs.

Disclosed herein are methods and systems to extract information regarding multiple types of relationships amongst individuals from a myriad of data sources, and to construct a multitude of disparate networks or graphs of the respective relationships.

Also disclosed herein are methods and systems to detect collaborative communities of individuals from the multitude of disparate networks (i.e., from the multiple types of relationships amongst the individuals) using a customized deep learning Multiplex Graph Convolutional Networks (MGCN) artificial intelligence machine learning (AIML) approach. A "collaborative community" refers to a group of nodes (i.e., representing individuals) that are densely connected within the community but only sparsely connected to nodes of other communities.

Examples are provided below with respect to collaborative communities of heath care providers or professionals (HCPs). Methods and systems disclosed herein are not, however, limited to HCPs.

FIG. 1 illustrates an example HCP collaborative community environment 100. Environment 100 includes example HCP professional networks (networks) 104. Networks 104 represent various types of relationships which may arise amongst HCPs and/or between HCPs and others (e.g., patients). Some types of relationships 104 may occur or arise naturally (e.g., through normal interactions amongst HCPs and/or between HCPs and others). Other types of relationships 104 may defined or created based on other factors (e.g., employment status, hospital privilege rights, etc.).

HCPs within networks 104 may evolve to form HCP collaborative communities 106, where one or more members of each collaborative community serves as, or is viewed as a primary or essential reference (e.g., influencer, motivator, point of contact, etc.) for other members of the community.

Networks 104 and/or collaborative communities 106 may be defined, characterized, and/or detected based on environmental and societal factors 102.

Data may need to be extracted from a myriad of data sources just to identify or define networks 104. Examples are provided further below with reference to FIG. 3.

Due to complexities (e.g., high volume and high dimensionality) of networks 104, HCP collaborative communities 106 may not be readily apparent or ascertainable from professional networks 104, even with conventional artificial intelligence machine learning.

Figure 2:
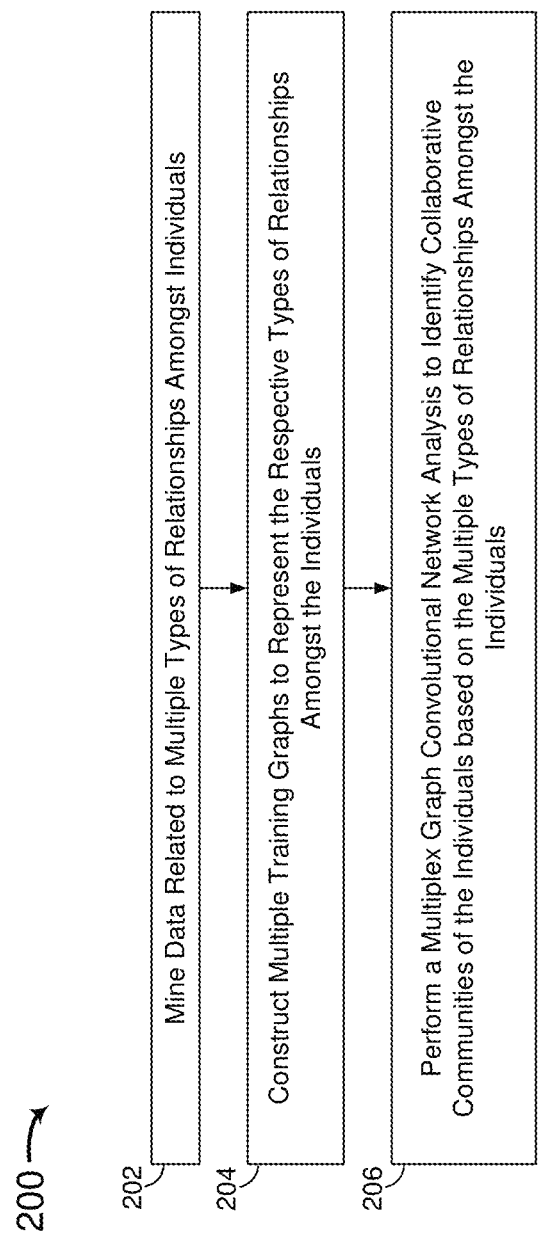
FIG. 2 is a process flowchart of a method of identifying collaborative communities of individuals from multiple types of relationships amongst the individuals.

FIG. 2 is a process flowchart of a method 200 of identifying collaborative communities of individuals from multiple types of relationships amongst the individuals.

At 202, data related to multiple types of relationships amongst individuals is mined from various data sources. The data sources may include public and/or proprietary data sources.

At 204, multiple training graphs are constructed to represent the respective types of relationships amongst individuals. Within each graph, individuals may be represented with nodes or vertices, relationships amongst the individuals may be represented with edges or links between the respective nodes/vertices.

At 206, a multiplex graph convolutional network (MGCN) analysis is performed across the multiple training graphs to identify collaborative communities of the individuals based on the multiple types of relationships amongst the individuals.

MGCN analysis at 206 may include machine learning/training a mathematical representation of the training graphs and clustering the individuals into communities based on the mathematical representation of the training graphs.

The machine learning/training may be configured to optimize a number of the communities relative to densities (e.g., modularity, homogeneity, and/or cohesiveness) of the communities. It may be useful to define or constrain collaborative communities to a set of relatively densely connected HCEs. If collaborative communities are defined to broadly, many links with the communities may be relatively weak. The machine learning/training may thus be configured to optimize a number of the communities relative to densities (e.g., modularity, homogeneity, and/or cohesiveness) of the communities.

Figure 3:
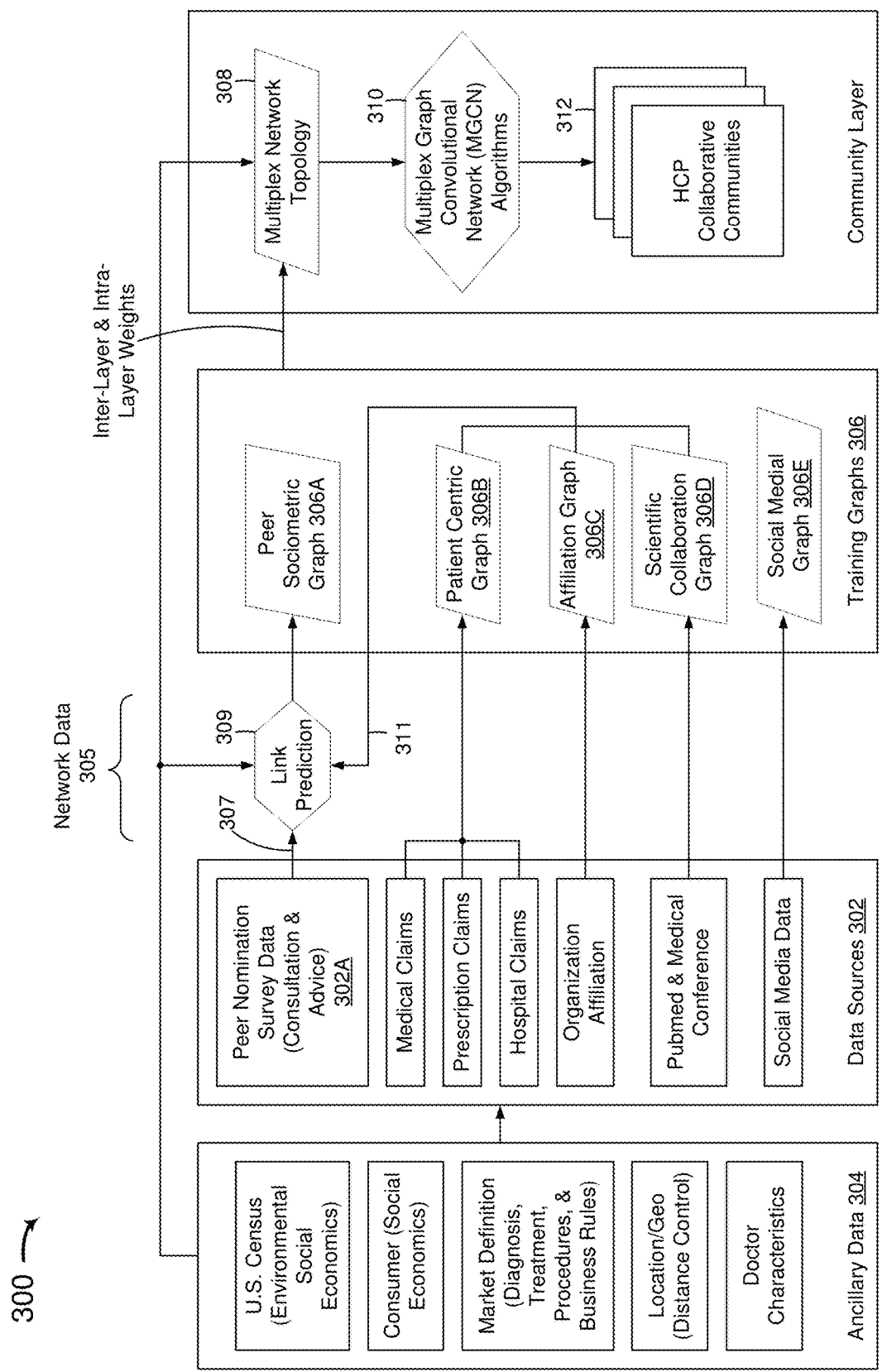
FIG. 3 illustrates an example HCP collaborative community framework.

FIG. 3 illustrates an example HCP collaborative community framework (framework) 300.

Framework 300 includes data sources 302, which may be mined for network data 305. Data mining may include defining factors/features relevant to individuals of interest. In a HCP application, this may include, without limitation, defining a therapeutic class(es), and crafting market definition and business rules (e.g., study period, look-back period, etc.). Data mining may include extracting a list of relevant individuals. In a HCP application, this may include, extracting a list of HCPs from a prescriber universe. Data mining may include appending geographical location, consumer attributes, doctor companion data and U.S. census social economics data to HCPs of interest and storing it as ancillary data 304.

Training graphs 306 are constructed from network data 305. Each training graph represents a respective type of relationship amongst HCPs. Types of relationships are not limited to the examples of FIG. 3.

Further in the example of FIG. 3, training graphs 306 are compressed into a multiplex network topology 308, which is processed/analyzed with MGCN algorithms 310 to identify HCP collaborative communities 312 based on the multiple types of relationships amongst the HCPs.

In the example of FIG. 3, network data sources 302 include a peer nomination survey data source 302A, which may provide peer nomination and survey data 307 for only a subset of the HCPs. In this example, framework 300 may further include a link prediction module 309 to predict peer nomination and survey data for remaining HCPs (e.g., based on provide peer nomination and survey data 307, affiliation graph data 311, and ancillary data 304). Peer nomination survey data 307 may include relationship information associated with advice and discussions amongst HCPs.

In the example of FIG. 3, training graphs 306 include peer sociometric graph 306A, a patient centric graph 306B, an affiliation graph 306C, a scientific collaboration graph 306D, and a social media graph 306E.

Peer sociometric graph 306A may represent discussion and advice relationships amongst HCPs.

Patient centric graph 306B may represent, without limitation, a relationship within a referral network (e.g., where a HCP refers a patient to another HCP for treatment) and/or a relationship within a non-referral patient sharing network (e.g., where a patient sees two HCPs in a short period of time, while the patient is not referred by one of the HCPs to the other HCP).

Affiliation graph 306C may represent HCPs affiliated by hospital, practice group, or other facility/entity/status.

Scientific collaboration graph 306D may represent relationships amongst HCPs who co-author a paper or co-present at a conference.

Social media graph 306E may represent HCPs who are connected through social media (e.g., Facebook, LinkedIn, Twitter, etc.).

Construction of patient centric graph 306B may include:
applying rules discussed above with respect to data mining;
extracting/mining patient level data (e.g., patient prescription (Rx) data, patient diagnosis (Dx) data, and/or clinical data management (CDM) patient level data);
bridging the patient level data with ancillary data 306;
constructing bi-partite networks between HCPs and patients;
projecting the bipartite networks to unipartite networks among HCPs; and
storing patient centric network topology data and numbers of co-treated patients as intra-network weights.

Construction of patient affiliation graph 306C may include:
bridging professional affiliation data (public and/or proprietary) with ancillary data 306;
constructing affiliation network 306C;
discarding an affiliation link if a distance between the respective HCPs is greater than k miles, where k is defined by a business rule; and
constructing and store affiliation network topology data.

Construction of scientific collaboration graph 306D may include:
constructing scientific collaboration graph 306D from PubMed MEDLINE citation database and online conference data;
finding co-authorship and co-presenter relationships between HCPs;
discarding link if a distance between the respective HCPs is greater than k miles;
constructing and storing scientific collaboration network topology data and numbers of collaborations as intra-network weights.

Construction of social media graph 306E may include:
constructing social media graph 306E based on public and/or proprietary social media network data; and
storing topology data and numbers of interactions as intra-network weights.

Construction of peer sociometric graph 306A may include:
bridging peer nomination survey doctors with a prescriber universe (e.g., public and/or proprietary, using National Provider Identifier (NPI);
creating link prediction training data;
building a link prediction model to project peer advice and discussion relationships amongst any two HCP peers with distance within k mile; and
storing sociometric peer graph topology data and numbers of discussions as intra-network weights.

Building of the link prediction model may include using:
the geographical location, the consumer attributes, the doctor companion data, and the U.S. census social economics data appended to HCPs of interest;
the stored affiliation network topology data; and
the intra-network weights of patient centric graph 306B, scientific collaboration graph 306D, and social media graph 306E; and
the Dx and Rx data.

Multiplex network topology 308 may be constructed based on:
the geographical location, the consumer attributes, the doctor companion data, and the U.S. census social economics data appended to HCPs of interest;

the stored affiliation network topology data; and the intra-network weights of peer sociometric graph 306A, patient centric graph 306B, scientific collaboration graph 306D, and social media graph 306E.

MGCN algorithms 310 may be configured to output:

community network topology (relationship links and tie weights);

HCP community leader score, multiplex centrality, and HCP community roles; and/or community measures (e.g., density, volume, betweenness, connected value, Rx size, etc.).

To summarize, in training graphs 306, HCP relationships or associations amongst HCPs are captured as links and strengths of links (e.g., weight based on how many times HCP's talk to one another in a day), and HCP characteristics (e.g., practice area/specialty, how many patients shared amongst doctors, etc.). These features will be embedded into a mathematical representation of training graphs 306. Strengths of links is a measure of how tightly HCPs are linked or related to one another. Relative influence of HCPs may be discerned from collaborative communities.

Collaborative Community Detection

Figure 4:
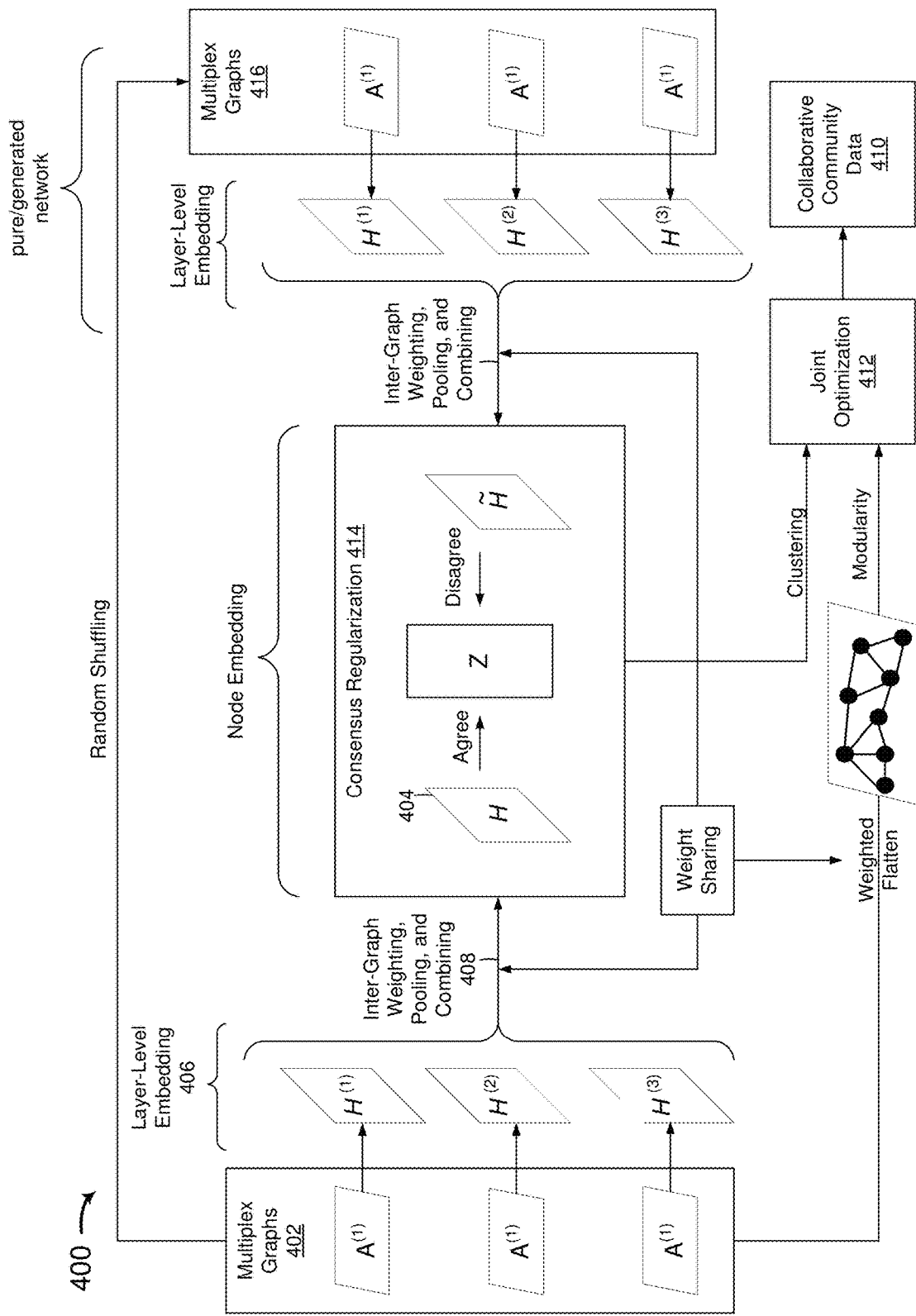
FIG. 4 is a schematic of an example multiplex graph convolutional network (MGCN) framework to identify collaborative communities of individuals from multiplex graphs.

FIG. 4 is a schematic 400 of an example multiplex graph convolutional network (MGCN) framework to identify collaborative communities 410 of individuals from multiplex graphs 402. Multiplex graphs 402 may represent multiple respective types of relationships amongst the individuals, such as described in one or more examples herein. Multiplex graphs 402 may serve as training data to train or tune parameters to optimize collaborative communities 410. Multiplex graphs 402 may be referred to herein as training graphs or training data.

Schematic 400 illustrates a multiplex graph convolutional network (MGCN) artificial intelligence machine/learning (AIML) process that is performed across multiple training graphs to identify collaborative communities of individuals based on the multiple types of relationships amongst the individuals.

In an embodiment, schematic 400 inputs a network structure (adjacent matrix) and node attributes and learns a hidden node representation (Z) through a deep multiplex graph infomax encoder. The learned node embedding then is fitted into a trainable soft clustering layer. The node clusters may be optimized to maximize graph modularity and minimize the loss of the graph encoder during training.

In the example of FIG. 4, schematic 400 contains three layers of graphs for illustration. Greater and/or fewer numbers of graphs may be utilized.

Multiplex graphs 402 may be compressed into a mathematical function 404, illustrated here as H. H represents a generalized or simplified form of graphs 402, which may be used to cluster individuals into collaborative communities 410. H may take the form of a vector or matrix.

Compression may include layer-level embedding at 406, intra-graph weighting, pooling, and combining at 408. With layer-level embedding, each graph of multiplex graphs 402 becomes a layer (e.g., layers $H^{(1)}$, $H^{(2)}$, and $H^{(3)}$).

Pooling is a process of compressing or reducing a dimensionality of a layer-level embedding. Pooling reduces the number of parameters to process, which reduces computation effort.

Artificial intelligence machine learning may be utilized to learn or tune mathematical representation 404 and/or to tune other parameters of schematic 400. Parameters may be tuned, for example, to optimize a number of collaborative communities 410 relative to densities (modularity/homogeneity/cohesiveness) of collaborative communities 410.

In the example of FIG. 4, schematic 400 includes joint optimization 412 to learn or tune parameters. Joint optimization 412 may be configured to compute a joint optimization parameter in accordance with EQ. (1):

$$\mathcal{J} = \sum_r \mathcal{L}^{(r)} + \alpha\left([Z-H]^2 - [Z-\tilde{H}]^2\right) + \beta \|\Theta\|^2 + \ell_{clustering} - \ell_{modularity} \quad \text{EQ. (1)}$$

where, $$\mathcal{L}^{(r)} = \sum_i \log D(h_i^{(r)}, s^{(r)}) + \sum_j \log\left(1 - D(\tilde{h}_j^{(r)}, s^{(r)})\right) \quad \text{EQ. (2)}$$

$$\ell_{clustering} = \sum_i \sum_k u_{ik} \|z_i - \mu_k\|^2 \quad \text{EQ. (3)}$$

$$\ell_{modularity} = \frac{1}{2m} \sum_{ij}\left[A_{ij} - \frac{k_i k_j}{2m}\right]\delta(c_i, c_j) \quad \text{EQ. (4)}$$

and where, $H^{(r)}$ is the r-th layer node embedding matrix with its i-th row vector denoted as $h_i^{(r)}$ which is the embedding vector for node i. In this example, a single graph convolutional layer encodes $H^{(r)}$, i.e., $$H^{(r)} = \sigma\left(\hat{D}_r^{-\frac{1}{2}} \hat{A}^{(r)} \hat{D}_r^{-\frac{1}{2}} W^{(r)}\right), \hat{A}^{(r)} = A^{(r)} + I_n, \text{ and } \hat{D}_{ii} = \sum_j \hat{A}_{ij}. \; \sigma \text{ is the ReLU activation.}$$

$\mathcal{L}^{(r)}$ is the layer specific cross entropy.

$s^{(r)}$ is layer-level graph summary representation that summarizes the global content of the subgraph for the r-th layer.

$\mathcal{D}$ is a discriminator that scores patch-representation pairs, $$\mathcal{D}(h_i^{(r)}, s^{(r)}) = \sigma(h_i^{(r)T} M s^{(r)}).$$

$\sigma$ is the sigmoid activation.

H is a weighted average pooling layer, i.e., $$H = \frac{1}{|R|} \sum_r \omega^{(r)} H^{(r)},$$

and $\omega$ is the inter-layer weight vector.

$\ell_{clustering}$ is a clustering objective function to optimize, Mk is the clustering center for the k-th cluster (community), $u_{ik}=1$ if node i belongs to cluster k.

$\ell_{modularity}$ is a modularity function to optimize, $A_{ij}$ represents the edge weight between node i and j for the flattened graph; $k_i$ and $k_j$ are the sum of the weights of the edges attached to nodes i and j, respectively; m is the sum of all edge weights; δ is Kronecker delta function, i.e., δ(x, y)=1 if x=y, 0 otherwise; $c_i$ and $c_j$ are the communities of the nodes i and j.

$\Theta=\{W^{(r)}, M, Z, \omega\}$ are trainable parameters. $\alpha$ controls the importance of the consensus regularization, and $\beta$ is a coefficient for $l_2$ regularization on $\Theta$.

In this way, H is learned/tuned as part of a broader joint optimization machine learning process in which parameters of multiple aspects of schematic 400 are jointly learned/tuned/optimized based on multiplex graphs 402 as training data, with a training objective or output being clusters/communities of HCPs.

Further regarding EQ. (1), parameters may be tuned to minimize $\ell_{modularity}$ and maximize $\ell_{modularity}$.

Example parameters are disclosed below, including fixed and tunable parameters. Methods and systems disclosed herein are not limited to the examples below.

Intra-Graph Weighting

Within multiplex graphs 402, a link between two nodes may be weighted to represent a strength or extent of a relationship between individuals represented by the respective nodes. Such a weight may be referred to herein as an intra-graph weight. Intra-graph weights may represent observable features of relationships.

For example, a link that represents a personal relationship between two individuals may be weighted based on a number of times the individuals communicate with one another, perhaps within a defined time period. Intra-graph links may remain fixed during joint optimization.

Inter-Graph Weighting

Multiplex graphs 402 may be weighted to reflect relative importance of the graphs. For example, with reference to FIG. 4, peer sociometric graph 604A may be weighted more heavily than social media graph 604E. Such weights may be referred to herein as inter-graph weights. Inter-graph weights may represent unobservable features, in that the relative importance of the corresponding networks is unknown at the outset. Inter-graph weights may be tuned as part of the joint optimization process (e.g., at 408 in FIG. 4). In this way, the relative importance of each graph is inferred by/during joint optimization. An optimum layer weight may be determined so that HCPs are separated into optimum clusters (e.g., maximally separate HCPs into different groups).

Dimensionality Reduction

Multiplex graphs 402 may include tens, hundreds, thousands, or even tens of thousands of dimensions/features (i.e., high dimensionality data). Such high dimensionality data may be impractical or even impossible to process with conventional algorithms on conventional machines. During pooling at 408, data dimensionality is reduced (e.g., to tens or hundreds of dimensions). This vastly reduces computational resources (e.g., number of operations) needed to perform functions described herein. Dimensionality reduction, in combination with joint optimization, makes it possible/practical to extract collaborative communities from multiplex graphs 402 in a machine (although it would still be impractical to perform in a human mind).

Pooling at 408 may be configurable with respect to a level or extent of dimensionality reduction (e.g., reduction to . . . , 10, 40, 100, 150, 200 . . . dimensions). In an embodiment, the level or extent of dimensionality reduction remains fixed during joint optimization. Alternatively, an optimum set of collaborative communities 410 is determined for each of multiple levels of dimensionality reduction. A loss function may be computed for each set of collaborative communities 410, and the set with the smallest loss function may be selected as an optimum set of collaborative communities 410. The extent of dimensionality reduction associated with the optimum set may be treated as a trained/tuned parameter.

Consensus Regularization

Joint optimization may be based in part on an accuracy of H (i.e., how well H represents multiplex graphs 402). In the example of FIG. 4, this is illustrated as consensus regularization 414.

In machine learning, regularization is a procedure that shrinks a co-efficient towards zero. In other terms, regularization means the discouragement of learning a more complex or more flexible machine learning model to prevent overfitting. It is also considered a process of adding more information to resolve a complex issue and avoid overfitting. Regularization applies mainly to the objective functions in problematic optimization.

For consensus regularization 414, multiplex graphs 416 are constructed (e.g., predicted from mathematical function H). Multiplex graphs 416 may be referred to herein as predicted multiplex graphs, corrupted multiplex graphs, generated multiplex graphs, and/or pure multiplex graphs.

Predicted multiplex graphs 416 may be compressed into a mathematical function, A, such as described above with respect to mathematical function H.

In consensus regularization 414, the mathematical functions are compared, and a consensus regularization function Z is determined based on the comparison. Consensus regularization function Z may indicate or represent how well H represents multiplex graphs 402.

Consensus regularization function Z may be utilized in joint optimization 412 (i.e., in computing a joint optimization function). EQ. (1), for example, includes the following regularization functions/parameters:

$$\alpha([Z-H]^2 - [Z-\tilde{H}]^2) + \beta \|\Theta\|^2$$

Joint optimization may include tuning parameters to minimize a difference between H and $\tilde{H}$, or to minimize Z. For example, as noted further above, $\Theta=\{W^{(r)}, M, Z, \omega\}$ are trainable parameters. $\alpha$ controls the importance of the consensus regularization, and $\beta$ is a coefficient for $l_2$ regularization on $\Theta$.

To summarize, multiplex graphs 402 are compressed into vectors (layer-level embedding), also referred to herein as embedding or transforming into a matrix form. A pooling layer combines the vectors/matrices using a regularization formula (e.g., to average them). In other words, a matrix is formed with consensus regularization, and weights are added into the matrix. The matrix is then decomposed into graph form (i.e., into predicted multiplex graphs 416). This provides a way to construct a loss function by comparing predicted multiplex graphs 416 to the real/input network (i.e., multiplex graphs 402), through an AI algorithm. If H is good/accurate, predicted multiplex graphs 416 should be similar to multiplex graphs 402. By comparing the two, a loss function may be computed. Parameters (e.g., inter-graph weights) may then be tuned to minimize the loss function to gradually evolve H. This may be referred to herein as learning/training/tuning a mathematical representation of the original network.

Output(s)

Collaborative communities 410 may be represented as or may include community network topology (e.g., relationship links and tie weights). Network topology data may be organized as rows and columns of data. Each row may include a pair of HCEs listed in respective columns of the row. Information regarding a relationship between the HCEs may be provided in another column of the row. Yet another column of the row may identify a collaborative community to which the pair of HCE's belong. This may be referred to herein as a bipartite data structure, in which HCEs are presented in pairs.

Collaborative communities 410 may include a HCP community leader score, a measure of multiplex centrality, and/or HCP community roles.

Collaborative communities 410 may include one or more community measures such as density, volume, betweenness, connected value, Rx size, etc.

Collaborative communities 410 may include doctor IDs, locations, community density of community, a measure of the community (e.g., betweenness value in Rx/sales value), information regarding relationships within each collaborative community, and/or a role of the collaborative community within the overall network. For each collaborative community, a leader may also be identified (i.e., one who sits in middle of the collaborative community, who has connections to majority of community members, and/or the most relationships within the collaborative community). Other members of a collaborative community may be identified as followers.

An individual may be assigned to a community to minimize loss.

An individual may be assigned to no more than one community, even if the individual has connections/relationships with individuals of other communities.

Collaborative communities 410 may be presented on a display, such as described below with reference to FIG. 5.

Figure 5:
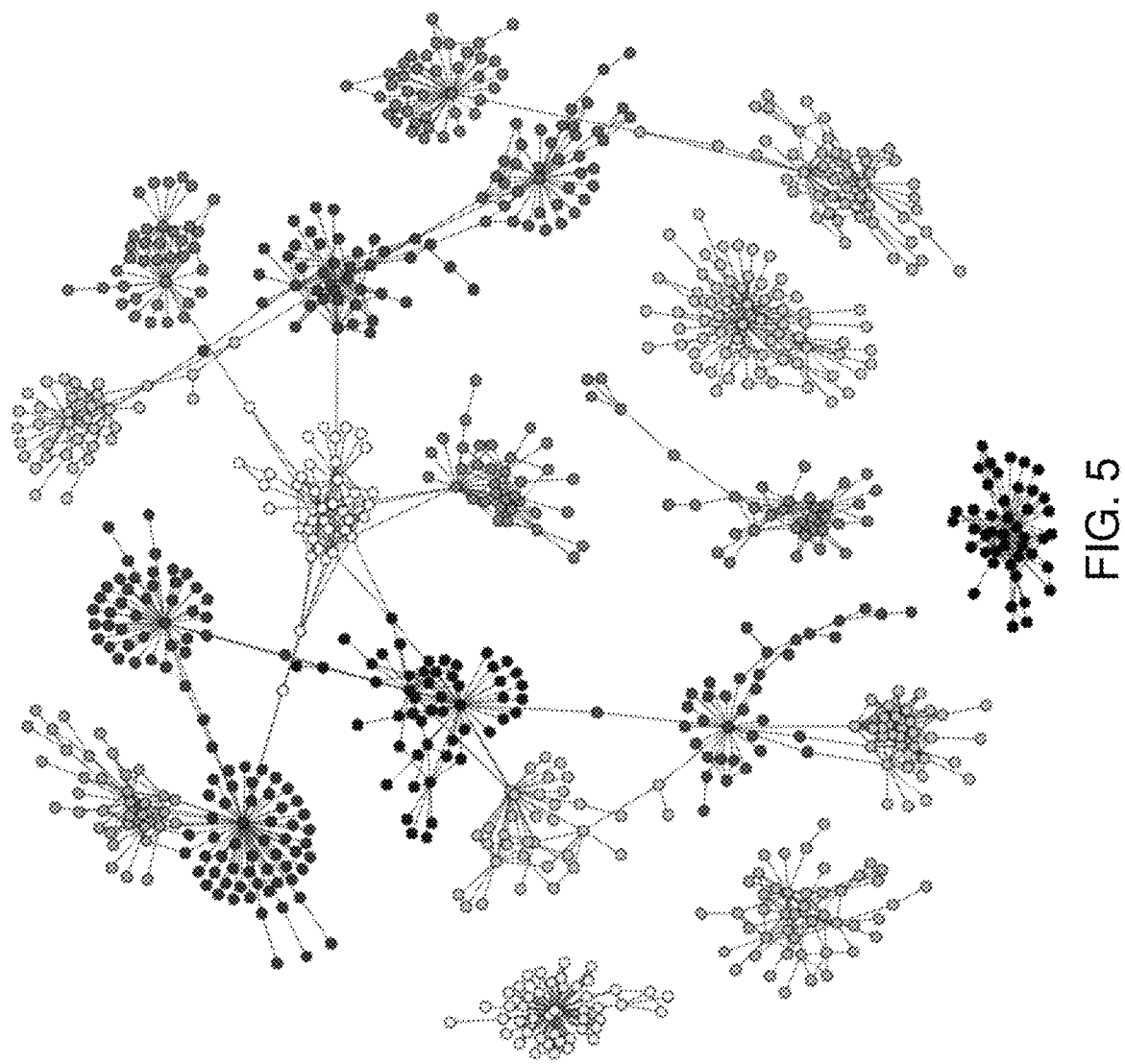
FIG. 5 is a graphical depiction of collaborative communities of individuals.

FIG. 5 is a graphical depiction of collaborative communities 500 of individuals. The graphical depiction may be presented on a display (e.g., individuals may be assigned 2-dimensional display coordinates). In the example of FIG. 5, icons representing the individuals are clustered within respective collaborative communities, with each icon positioned within a cluster based on a relative level of influence of the respective individual within the collaborative community. In the example of FIG. 5, icons representing community leaders are positioned in the centers of the respective communities. Icons representing followers are positioned progressively outward, toward a periphery of the respective collaborative communities, based on the strength of their relationship to the leader. Links may be displayed between pairs of icons to represent a relationship between the respective individuals.

Additional Features

Figure 6:
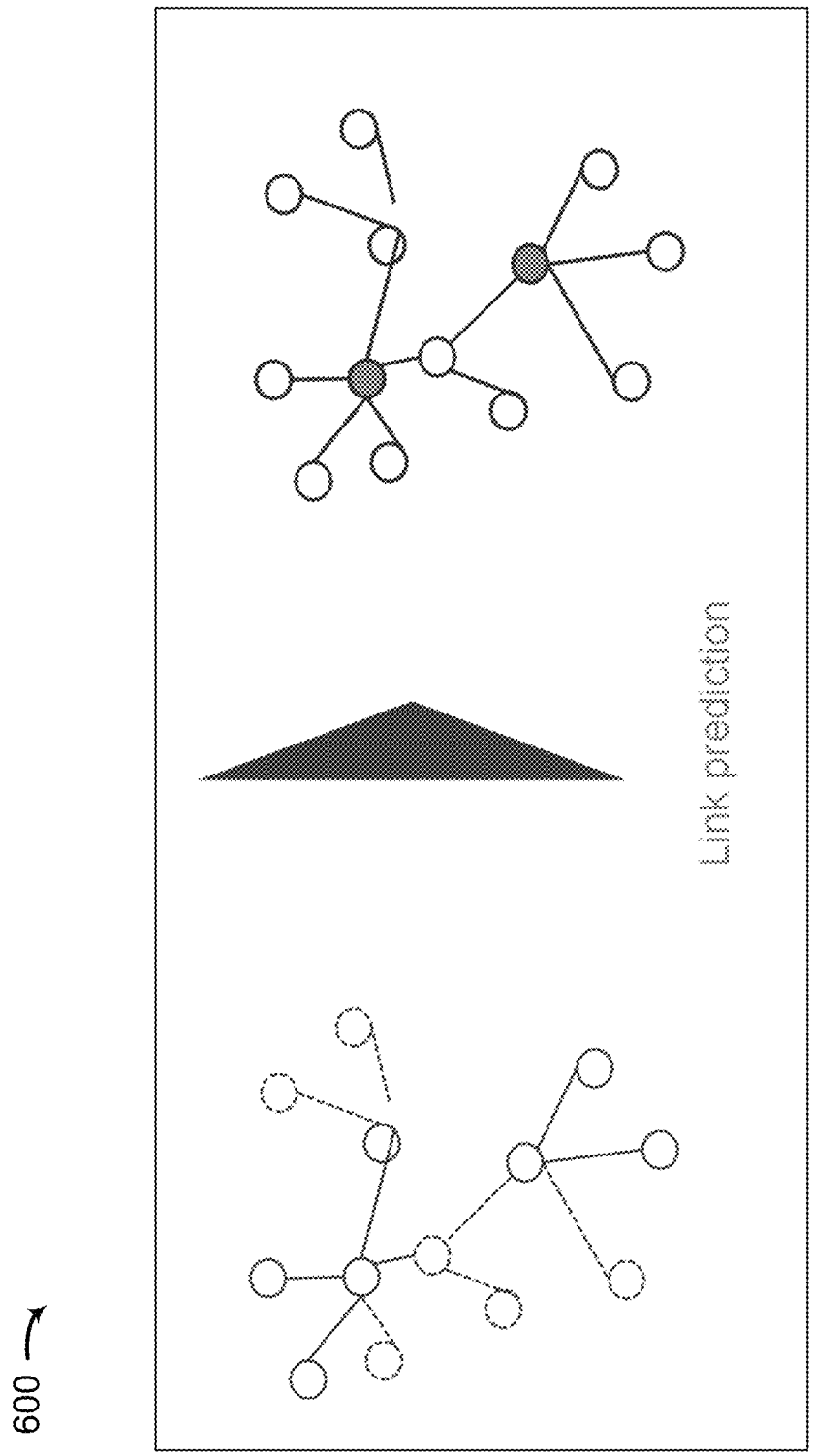
FIG. 6 is a graphical depiction of link prediction to reconstruct a sociometric peer network.

FIG. 6 is a graphical depiction of link prediction 600 to reconstruct a sociometric peer network, such as described further above with reference to 309 in FIG. 3. A sociometric peer network may play a role in new product adoption and knowledge diffusion. In some situations, only a portion of a sociometric peer network is known through a survey sample. Link prediction is to reconstruct a more complete strong tie network using survey data, Rx and Dx, prescriber universe (e.g., Onekey database). Without constructing a more complete network using link prediction, some local leaders may be missed, and leader rankings may be biased.

Figure 7:
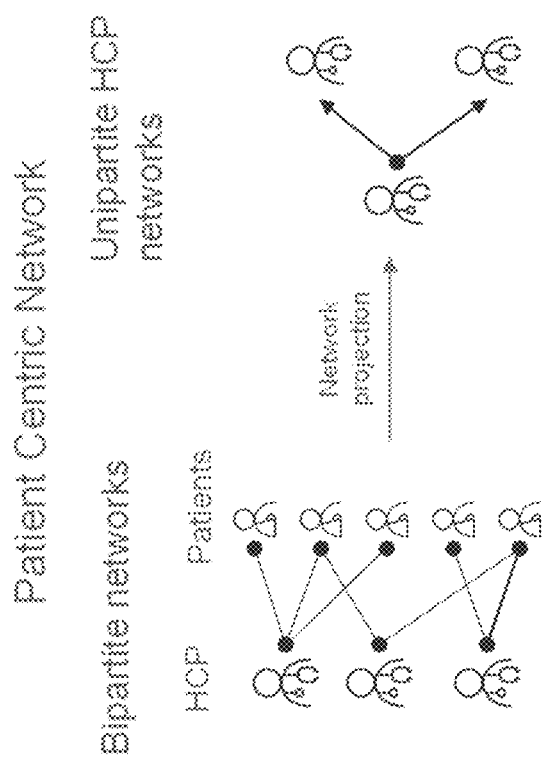
FIG. 7 is a graphical depiction of construction of a patient centric graph, from bipartite to unipartite.

FIG. 7 is a graphical depiction 700 of construction of a patient centric graph, from bipartite to unipartite.

Figure 8:
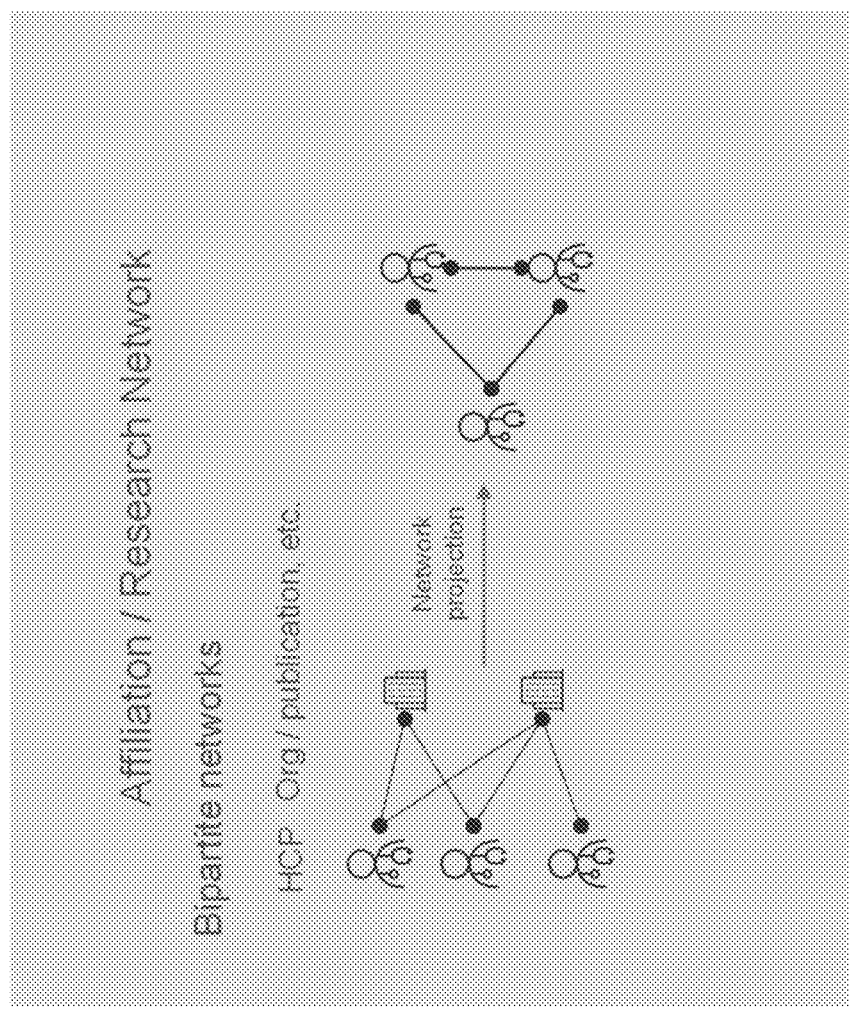
FIG. 8 is a graphical depiction of construction of an affiliation/research graph, from bipartite to unipartite.

FIG. 8 is a graphical depiction 800 of construction of an affiliation/research graph, from bipartite to unipartite.

Figure 9:
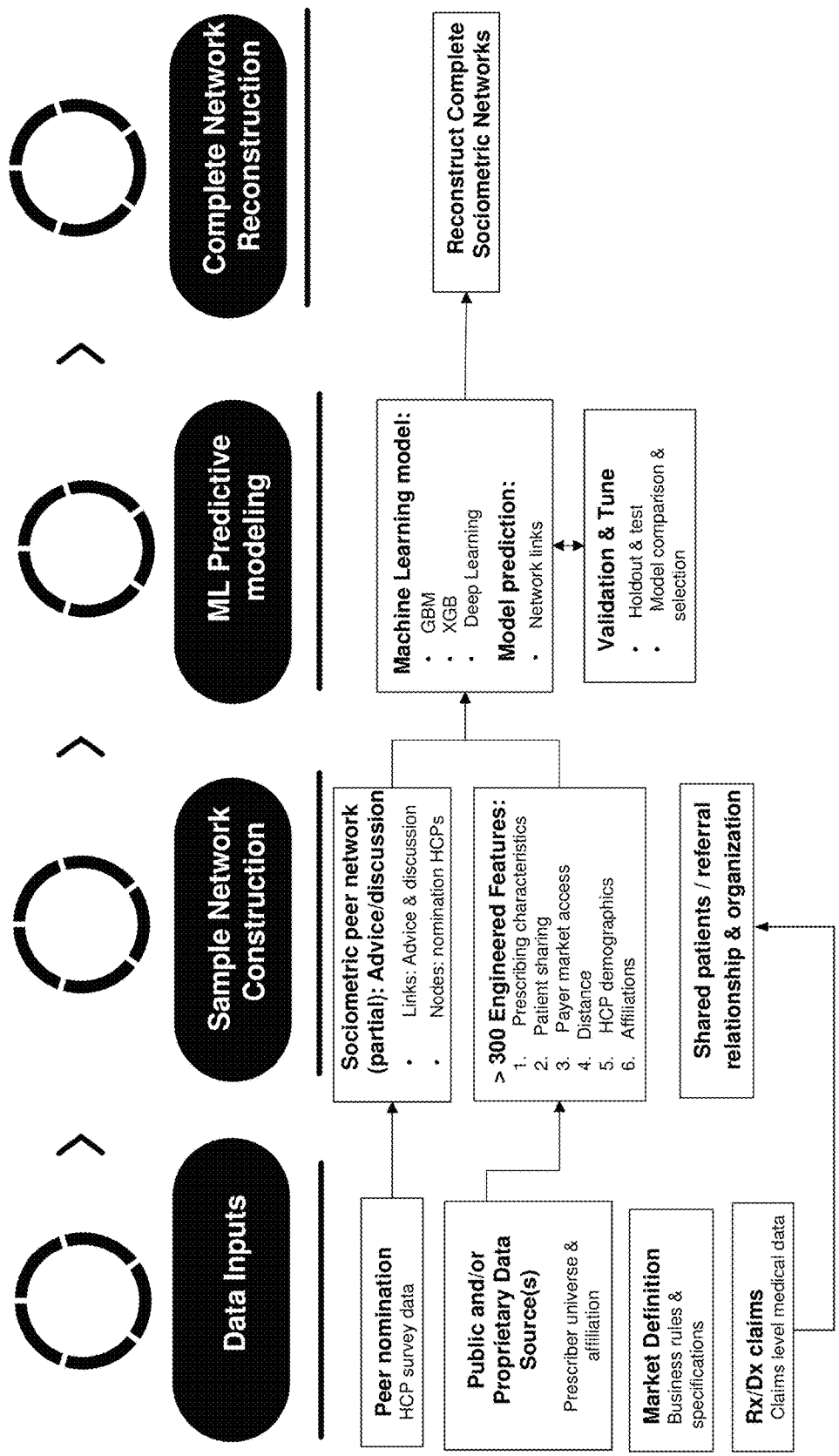
FIG. 9 illustrates a method of key opinion leader (KOL) link prediction for HCPs.

FIG. 9 illustrates a method 900 of key opinion leader (KOL) link prediction for HCPs.

Example Implementations

One or more features disclosed herein may be implemented in, without limitation, circuitry, a machine, a computer system, a processor and memory, a computer program encoded within a computer-readable medium, and/or combinations thereof. Circuitry may include discrete and/or integrated circuitry, application specific integrated circuitry (ASIC), a system-on-a-chip (SOC), and combinations thereof.

Information processing by software may be concretely realized by using hardware resources.

Figure 10:
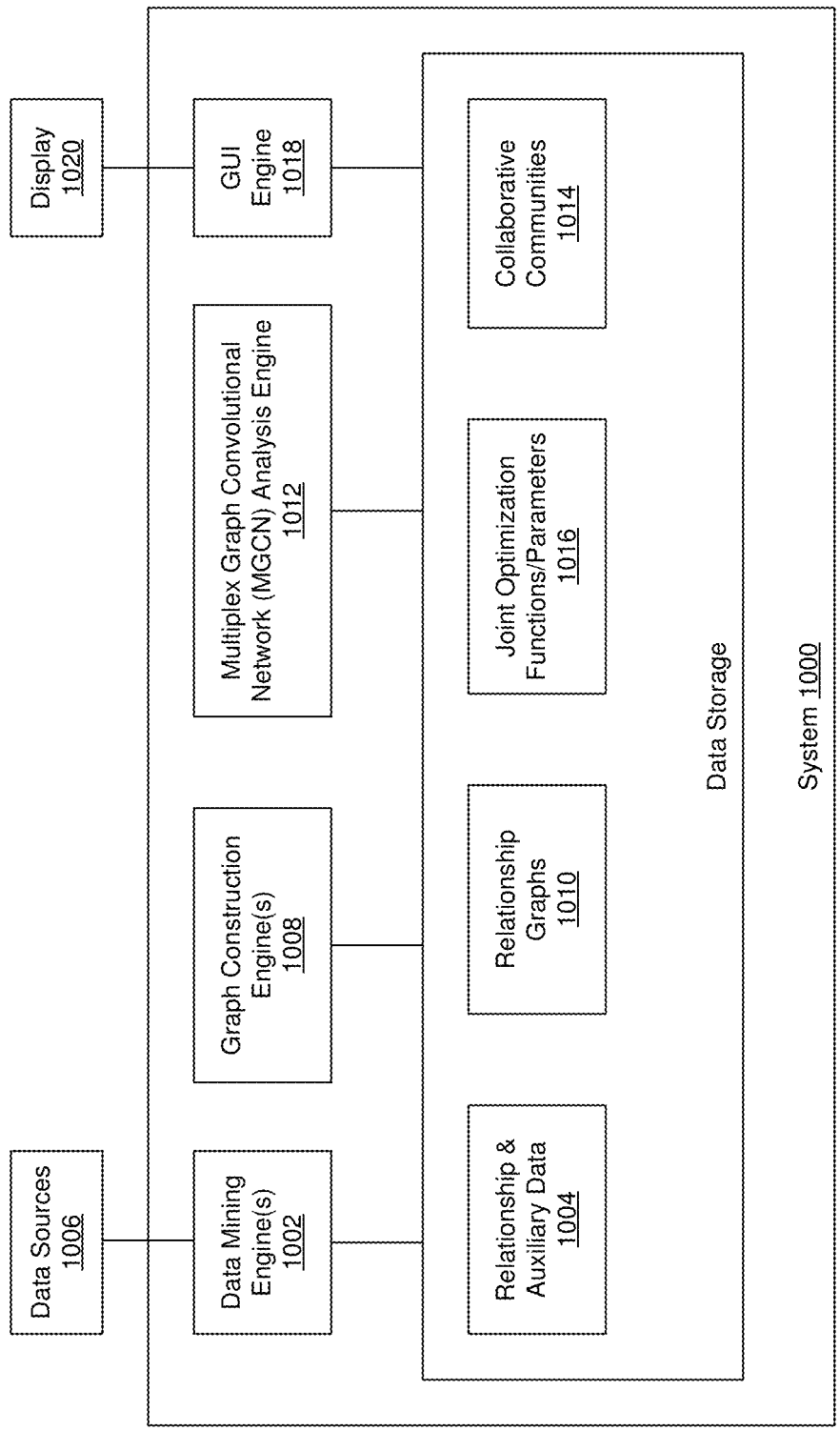
FIG. 10 is a block diagram of a system to identify collaborative communities of individuals from multiple types of relationships amongst the individuals.

FIG. 10 is a block diagram of a system 1000 to identify collaborative communities of individuals from multiple types of relationships amongst the individuals.

System 1000 includes a data mining engine 1002 to mine relationship and auxiliary data 1004 from data sources 1006, such as described in one or more examples herein.

System 1000 further includes a graph construction engine 1008 to construct relationship graphs 1010 from relationship and auxiliary data 1004, such as described in one or more examples herein.

System 1000 further includes a multiplex graph convolutional network (MGCN) analysis engine 1012 to identify collaborative communities 1014 from relationship graphs 1010. MGCN analysis engine 1012 may be configured to learn/train joint optimization functions/parameters 1016, such as described in one or more examples herein.

System 1000 further includes a graphical user interface (GUI) engine 1018 to present information related to collaborative communities 1014 on a display 1020, such as described in one or more examples herein.

Figure 11:
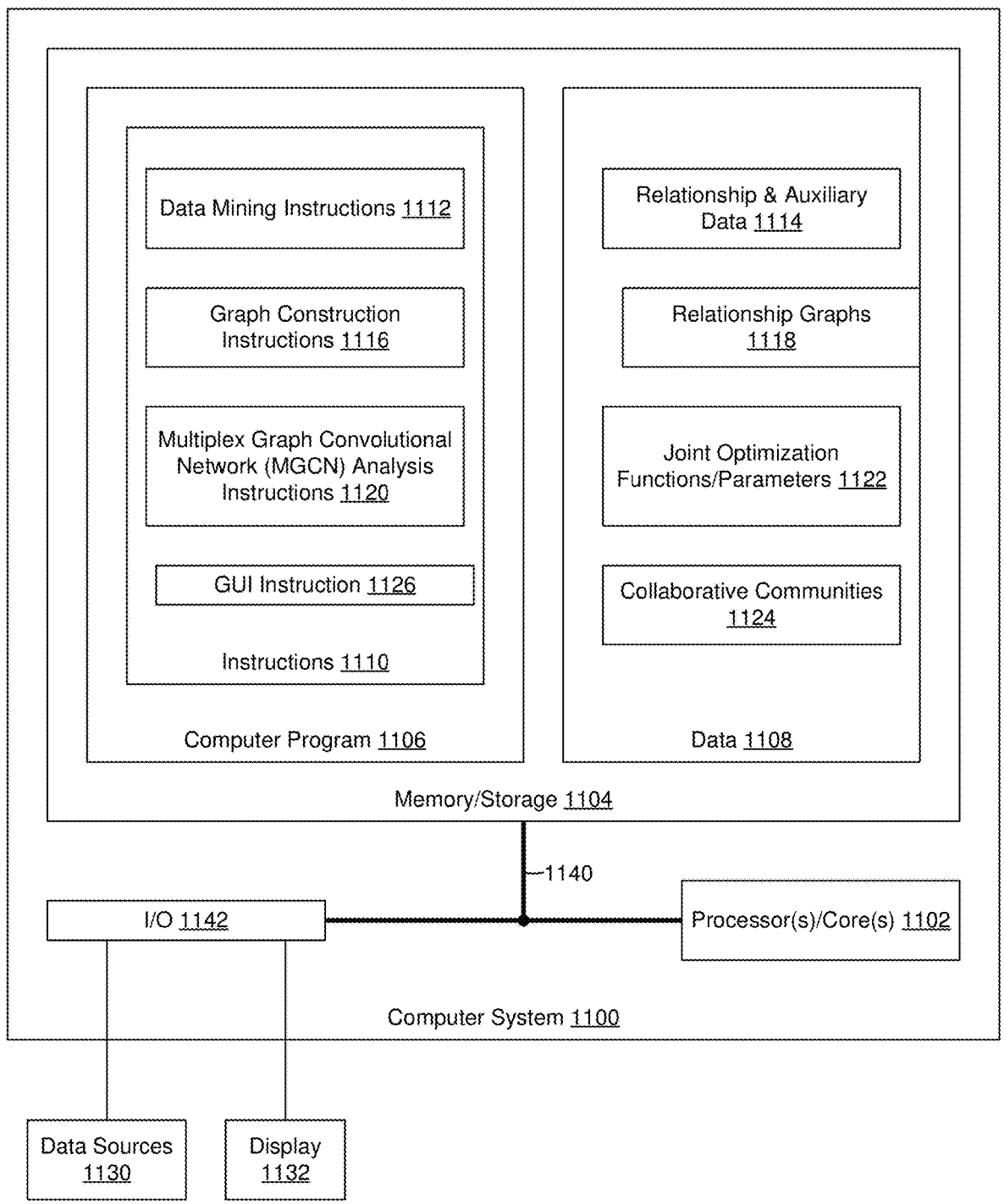
FIG. 11 is a block diagram of a computer system configured to identify collaborative communities of individuals from multiple types of relationships amongst the individuals.

FIG. 11 is a block diagram of a computer system 1100, configured to identify collaborative communities of individuals from multiple types of relationships amongst the individuals.

Computer system 1100 includes one or more instruction processors, illustrated here as a processor 1102, to execute instructions 1110 of a computer program 1106 encoded within a computer-readable medium 1104. Computer-readable medium 1104 further includes data 1108, which may be used by processor 1102 during execution of computer program 1106, and/or generated by processor 1102 during execution of computer program 1106.

Computer-readable medium 1104 may include a transitory or non-transitory computer-readable medium.

In the example of FIG. 11, instructions 1110 include data mining instructions 1112 to cause processor 1102 to mine relationship and auxiliary data 1114 from data sources 1130, such as described in one or more examples herein.

Instructions 1110 further include graph construction instructions 1116 to cause processor 1102 to construct relationship graphs 1118 from relationship and auxiliary data 1114, such as described in one or more examples herein.

Instructions 1110 further include multiplex graph convolutional network (MGCN) analysis instructions 1120 to cause processor 1102 to identify collaborative communities 1124 from relationship graphs 1118. MGCN analysis instructions 1120 may be configured to cause processor 1102 to learn/train joint optimization functions/parameters 1122, such as described in one or more examples herein.

Instructions 1110 further include graphical user interface (GUI) instructions 1126 to cause processor 1102 to present information related to collaborative communities 1124 on a display 1132, such as described in one or more examples herein.

Computer system 1100 may include communications infrastructure 1140 to communicate amongst devices and/or resources of computer system 1100.

Computer system 1100 may include one or more input/output (I/O) devices and/or controllers 1142 to interface with data sources 1130 and display 1132.

Example Applications

Methods and systems disclosed herein may be useful to overcome unique challenges in detecting communities in HCP multiplex networks. Detection of HCP collaborative communities may open new avenues to pharmaceutical commercialization. Such a community solution may be useful in omni-channel marketing, next-best AIML platform solution, thought leader and physician targeting, etc.

By harnessing a variety of opensource and/or proprietary data, as disclosed herein, complex community structures may be uncovered and collaborative communities of individuals who are linked through multi-dimensional relationships may be detected.

In a healthcare environment, identification of collaborative communities may provide a basis for community-based patient care and brand commercial strategies, such as next-best customer identification, leader influence mapping, and product launch planning. Uncovering the constituents and characteristics of such collaborative communities may be useful to integrate care, avoid redundancy, reduce cost, and improve patient health outcomes. Potential applications include:

Marketing Optimization:
Optimization of promotional strategies based on HCP's community-wise value instead of individual value; and
Identification of "hidden gems" that are influential within communities but not actively practicing.
Next-best-customer:
Prioritize physician targets using their community value such as leaders and followers;
Design a strategy that aligns with the information diffusion model; and
Leverage the sophistication of targeting customers in sequence.
Key Opinion Leader (KOL), Segmentation, Targeting, Sizing, and Planning:
Add community information and metric into the segmentation process;
Plan and deploy sales force according to community value;
Leverage connectedness of communities to accelerate adoption of a new therapy; and
Optimize speaker programs with informed audience invitation.
Pull-through via other field force teams:
Enhance the pull-through after a payer win and/or new data published.
Lifecycle management:
Accelerate pre-launch awareness; and
Right-size the field force via community-wise strategy.
Patient Outcome research:
Strengthen patient care co-ordination; and
Improve patient experience.
Identification of collaborative communities, in an HCP environment, may be useful for, without limitation:
care coordination (e.g., primary and secondary care coordination/comanaging, cross-specialists);
information sharing (e.g., data transfer, knowledge sharing, consultancy); and/or
building relationships (e.g., professional connections, medical advice).
HCP collaborative communities may provide or lead to, without limitation:
improved health outcome and patient experience;
reduced redundancy and cost;
enhanced technology diffusion; and/or
accelerated knowledge sharing and adoption of therapy.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:

1. A machine-implemented method, comprising:
mining data related to multiple types of relationships amongst individuals;
constructing multiple training graphs to represent the respective types of relationships amongst the individuals; and
performing a multiplex graph convolutional network (MGCN) artificial intelligence machine learning (AIML) analysis across the multiple training graphs to identify collaborative communities of the individuals based on the multiple types of relationships amongst the individuals, the performing comprising clustering the individuals into communities based on a mathematical representation of the training graphs, wherein the mathematical representation is machine tuned to optimize the clustering and to optimize a number of the collaborative communities relative to densities of the collaborative communities.

2. The machine-implemented method of claim 1, wherein the machine tuning comprises:
machine tuning weights applied to the training graphs to optimize the clustering.

3. The machine-implemented method of claim 1, wherein the performing further comprises:
displaying the collaborative communities of the individuals such that relative positions of the individuals within the collaborative communities represent measures of influence exerted by the respective individuals within the collaborative communities.

4. The machine-implemented method of claim 1, wherein the performing comprises:
translating the training graphs into a first mathematical function;
generating predicted graphs based on the first mathematical function;
translating the predicted graphs into a second mathematical function;
determining consensus regularization function based on the first and second mathematical functions;
clustering the individuals based on the first mathematical function;
computing a joint optimization function based on a measure of the clustering and the consensus regularization function; and
machine tuning multiple parameters to optimize the joint optimization function, wherein the multiple parameters include weights applied to the training and predicted multiplex graphs and a weight applied to the consensus regularization function.

5. The machine-implemented method of claim 1, wherein the constructing comprises:
constructing a peer sociometric training graph of healthcare professionals (HCPs) based on peer nomination surveys and link predictions generated from the peer nomination surveys;

constructing a patient centric training graph of the HCPs based on medical claims, prescription claims, and/or hospital claims of patients of the HCPs;

constructing an affiliation training graph of the HCPs based on organization affiliations of the HCPs;

constructing a scientific collaboration training graph based on medical conference co-presenter data and publication co-authorship data; and constructing a social medial training graph of the HCPs based on social media contacts of the HCPs.

6. The machine-implemented method of claim 1, wherein the performing further comprises, for each collaborative community, determining a measure of the collaborative community, wherein the measure of the collaborative community includes density, volume, betweenness, connected value, and Rx size.

7. The machine-implemented method of claim 1, wherein the performing further comprises, for each collaborative community, determining a community leader score for each member of each collaborative community.

8. The machine-implemented method of claim 1, wherein the performing further comprises, for each collaborative community, determining a community leader score for each member of each collaborative community.

9. An apparatus, comprising a processor and memory configured to:

mine data related to multiple types of relationships amongst individuals;

construct multiple training graphs to represent the respective types of relationships amongst individuals; and perform a multiplex graph convolutional network (MGCN) artificial intelligence machine learning (AIML) analysis across the multiple training graphs to identify collaborative communities of the individuals based on the multiple types of relationships amongst the individuals, the performing comprising clustering the individuals into communities based on a mathematical representation of the training graphs, wherein the mathematical representation is machine tuned to optimize the clustering and to optimize a number of the collaborative communities relative to densities of the collaborative communities.

10. The apparatus of claim 9, wherein the processor and memory are further configured to:

machine tune weights applied to the training graphs to optimize the clustering.

11. The apparatus of claim 9, wherein the processor and memory are further configured to, for each collaborative community:

determine a community role for each collaborative community;

determine a community leader score for each member of each collaborative community;

determine a measure of centrality for each member of each collaborative community; and determine a measure of the collaborative community, wherein the measure of the collaborative community includes density, volume, betweenness, connected value, and Rx size.

12. The apparatus of claim 9, wherein the processor and memory are further configured to:

display the collaborative communities of the individuals such that relative positions of the individuals within the collaborative communities represent measures of influence exerted by the respective individuals within the collaborative communities.

13. The apparatus of claim 9, wherein the processor and memory are further configured to:

translate the training graphs into a first mathematical function;

generate predicted graphs based on the first mathematical function;

translate the predicted graphs into a second mathematical function;

determine consensus regularization function based on the first and second mathematical functions;

cluster the individuals based on the first mathematical function;

compute a joint optimization function based on a measure of the clustering and the consensus regularization function; and machine tune multiple parameters to optimize the joint optimization function, wherein the multiple parameters include weights applied to the training and predicted multiplex graphs and a weight applied to the consensus regularization function.

14. The apparatus of claim 9, wherein the processor and memory are further configured to:

construct a peer sociometric training graph of healthcare professionals (HCPs) based on peer nomination surveys and link predictions generated from the peer nomination surveys;

construct a patient centric training graph of the HCPs based on medical claims, prescription claims, and/or hospital claims of patients of the HCPs;

construct an affiliation training graph of the HCPs based on organization affiliations of the HCPs;

construct a scientific collaboration training graph based on medical conference co-presenter data and publication co-authorship data; and construct a social medial training graph of the HCPs based on social media contacts of the HCPs.

15. A non-transitory computer readable medium encoded with a computer program that comprises instructions to cause a processor to:

mine data related to multiple types of relationships amongst individuals;

construct multiple training graphs to represent the respective types of relationships amongst individuals; and perform a multiplex graph convolutional network (MGCN) artificial intelligence machine learning (AIML) analysis across the multiple training graphs to identify collaborative communities of the individuals based on the multiple types of relationships amongst the individuals, the performing comprising clustering the individuals into communities based on a mathematical representation of the training graphs, wherein the mathematical representation is machine tuned to optimize the clustering and to optimize a number of the collaborative communities relative to densities of the collaborative communities.

16. The non-transitory computer readable medium of claim 15, further comprising instructions to cause the processor to:

machine tune weights applied to the training graphs to optimize the clustering.

17. The non-transitory computer readable medium of claim 15, further comprising instructions to cause the processor to, for each collaborative community:

determine a community role for each collaborative community;

determine a community leader score for each member of each collaborative community;

determine a measure of centrality for each member of each collaborative community; and/or determine a measure of the collaborative community, wherein the measure of the collaborative community includes density, volume, betweenness, connected value, and Rx size.

18. The non-transitory computer readable medium of claim 15, further comprising instructions to cause the processor to:

display the collaborative communities of the individuals such that relative positions of the individuals within the collaborative communities represent measures of influence exerted by the respective individuals within the collaborative communities.

19. The non-transitory computer readable medium of claim 15, further comprising instructions to cause the processor to:

translate the training graphs into a first mathematical function;

generate predicted graphs based on the first mathematical function;

translate the predicted graphs into a second mathematical function;

determine consensus regularization function based on the first and second mathematical functions;

cluster the individuals based on the first mathematical function;

compute a joint optimization function based on a measure of the clustering and the consensus regularization function; and machine tune multiple parameters to optimize the joint optimization function, wherein the multiple parameters include weights applied to the training and predicted multiplex graphs and a weight applied to the consensus regularization function.

20. The non-transitory computer readable medium of claim 15, further comprising instructions to cause the processor to:

construct a peer sociometric training graph of healthcare professionals (HCPs) based on peer nomination surveys and link predictions generated from the peer nomination surveys;

construct a patient centric training graph of the HCPs based on medical claims, prescription claims, and/or hospital claims of patients of the HCPs;

construct an affiliation training graph of the HCPs based on organization affiliations of the HCPs;

construct a scientific collaboration training graph based on medical conference co-presenter data and publication co-authorship data; and construct a social medial training graph of the HCPs based on social media contacts of the HCPs.

\* \* \* \* \*